United States Patent [19]
Oetiker

[11] Patent Number: 5,326,325
[45] Date of Patent: Jul. 5, 1994

[54] CLAMP STRUCTURE FOR BALANCING ROTATING MEMBERS

[75] Inventor: Hans Oetiker, Horgen, Switzerland

[73] Assignee: Hans Oetiker AG Maschinen- und Apparatefabrik, Switzerland

[21] Appl. No.: 988,281

[22] Filed: Dec. 9, 1992

[51] Int. Cl.⁵ .................. B65D 63/02; F16L 33/00
[52] U.S. Cl. .................... 464/180; 24/20 R; 24/20 CW
[58] Field of Search ......... 464/180; 24/20 R, 20 CW, 24/20 S, 20 EE; 73/455, 460, 469, 487; 74/573 R, 574

[56] References Cited

U.S. PATENT DOCUMENTS

| | | | |
|---|---|---|---|
| 3,303,669 | 2/1967 | Oetiker | 24/20 CW |
| 3,901,046 | 8/1975 | Hofmann | 464/180 X |
| 4,237,584 | 12/1990 | Oetiker | 24/20 CW X |
| 4,998,326 | 3/1991 | Oetiker | 24/20 R |
| 5,052,082 | 10/1991 | Uchman | 24/20 CW |
| 5,165,146 | 11/1992 | O'Keefe | 24/20 R |
| 5,177,836 | 1/1993 | Kemmerich | 24/20 R |

Primary Examiner—Clifford D. Crowder
Assistant Examiner—John J. Calvert
Attorney, Agent, or Firm—Paul M. Craig, Jr.

[57] ABSTRACT

A balancing arrangement for a rotating member which includes a clamp structure with a clamping band adapted to be tightened on the rotating member; the clamping band includes a first inner clamping band portion and a second outer clamping band portion either integral with or fixedly secured to the first clamping band portion. A counterweight is thereby adapted to be slidably mounted on the second clamping band portion and to be secured thereon in predetermined balancing position.

25 Claims, 3 Drawing Sheets

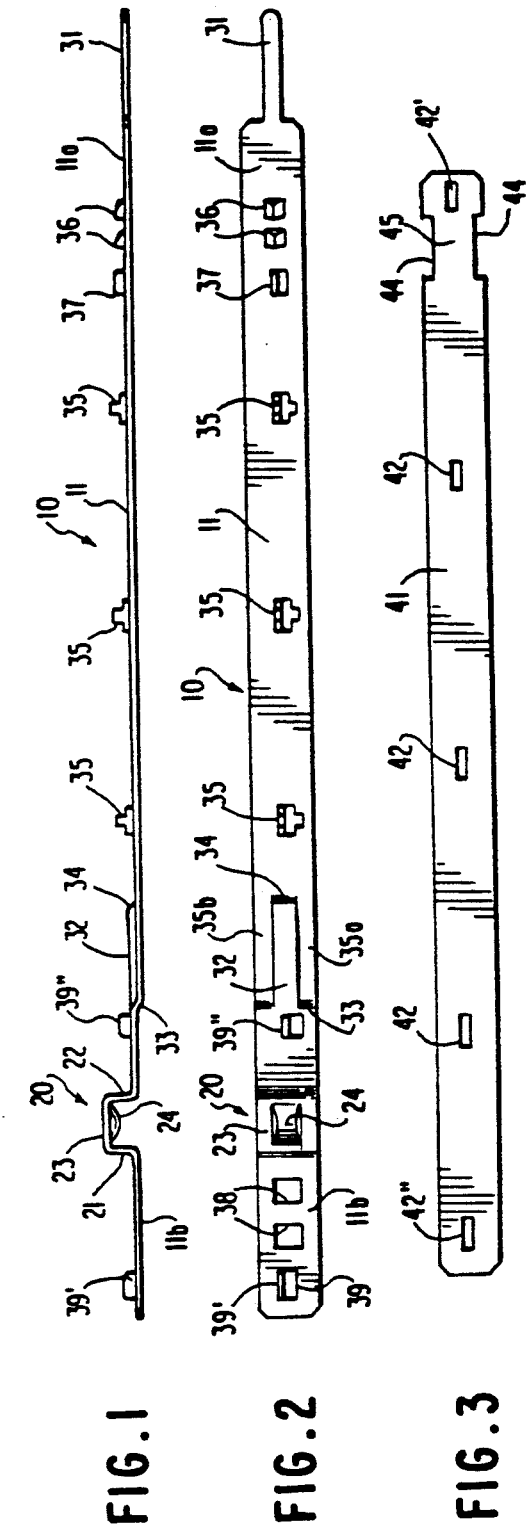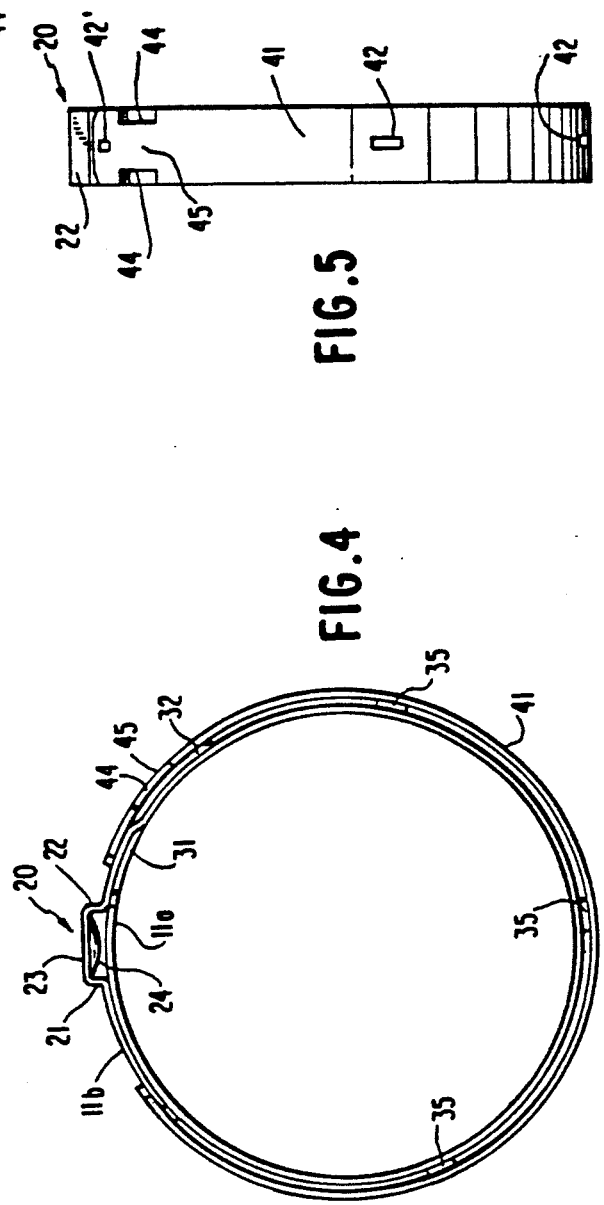
FIG. 1
FIG. 2
FIG. 3
FIG. 4
FIG. 5

CLAMP STRUCTURE FOR BALANCING ROTATING MEMBERS

FIELD OF INVENTION

The present invention relates to a balancing arrangement for a rotating member and more particularly to a clamp structure which permits the elimination of imbalances by one or more counterweight members mounted on a clamp structure.

BACKGROUND OF THE INVENTION

Balancing arrangements by means of counterweights are known as such in the prior art, for example, for statically and dynamically balancing the wheels of automobiles. The counterweights made from lead or lead alloys are thereby mounted on the rim of the wheel in the proper position as determined by a dynamic testing machine.

The use of a clamp structure to balance a rotating member such as a drive shaft is also known in the prior art, as disclosed, for example, in U.S. Pat. No. 3,901,046 to Hofmann. In this patent, a so-called screw-type clamp is used, whereby the fixed weight of the screw-type adjusting mechanism has to be compensated by one or more counterweights mounted more or less opposite to the adjusting device. The balancing arrangement of this prior U.S. patent entails a number of disadvantages as regards manufacture and installation and additionally is not suitable for fastening, for example, axle boots in a completely satisfactory manner on drive shafts to be balanced by the use of a clamp structure, particularly when relatively hard, thin-walled axle boot materials are used which pose special problems as regards possible leakages.

SUMMARY OF THE INVENTION

It is a primary object of the present invention to provide a balancing arrangement by the use of a clamp structure which is simple to manufacture and easy to install and at the same time assures reliable maintenance of the balanced condition.

Another object of the present invention resides in a balancing arrangement by the use of a clamp structure which has universal applicability in that it can be used also for purposes of securing a thin-walled plastic member such as a hose or axle boot on a rotating part, such as a drive shaft to assure a completely satisfactory seal and at the same time is able to permit reliable balancing of any existing imbalances in the assembled parts consisting of rotating member, hose-like member and clamp structure.

A still further object of the present invention resides in a clamp structure in which the counterweight(s) do not interfere with the clamping function of the clamp structure.

These objects are attained according to the present invention in that the clamp structure consists of first and second clamping band portions whereby the clamping function is performed by the first inner clamping band portion while the second clamping band portion at least partially surrounding the first clamping band portion is used for installing and securing one or more counterweights in positions as determined by conventional testing equipment.

The second clamping band portion may thereby be made in one piece with the first clamping band portion or the second clamping band portion may be a separate clamping band portion which is secured at both ends to the first clamping band portion.

According to another feature of the present invention, the first and second clamping band portions are secured against relative movement in both the circumferential and axial direction. This is preferably achieved by one or more outwardly extending tab-like members in the first clamping band portion which extend in the circumferential direction of the clamp structure and which are adapted to engage in corresponding slot-like openings in the first clamping band portion.

According to still another feature of the present invention, the second clamping band portion is provided with mutually oppositely disposed cut-outs which leave therebetween a narrower central web portion of the second clamping band portion. The counterweight which includes a housing, for example, made from a cold-forged steel band or from sintered metal powder which is hollow on the inside to accommodate the counterweight material, includes mutually oppositely directed foot portions directed toward one another which are spaced from the bottom of the housing a distance equal to or slightly greater than the thickness of the band material and which are of such shape that they can enter the lateral cut-outs from above and then permit sliding movement on the second clamping band portion when displaced in the circumferential direction. The counterweight housing which is hollow is provided with one, or preferably two or more fill-in openings to pour the counterweight material such as molten lead or similar material into the hollow spaces formed thereby. Additionally, the counterweight is provided with a bore, at least partially threaded in the lower part thereof for receiving a threaded set-screw member to fix the counterweight on the second clamping band portion. The set-screw member, which is accessible from the top through the bore, can then be screwed inwardly to securely seat the counterweight on the second clamping band portion. To avoid injury, the set-screw member is thereby so constructed, for example, by an enlargement at the inner end, that it cannot be screwed out beyond a certain point and/or forced out by vibrations or centrifugal forces. To further secure the counterweight on the second clamping band portion, a special tool is provided which applies lateral pressure on the clamping band portion on which the counterweight material is mounted so as to deform this clamping band portion and thereby securely retain the counterweight material in the balanced position. The significant advantages obtainable by the present invention reside in a clamp structure for balancing a rotating member which, at the same time, can be so constructed as to avoid any internal projections, offsets or steps which is important with present-day, thin hard plastic hose materials to be sealingly mounted on rotating members to be balanced.

BRIEF DESCRIPTION OF THE DRAWINGS

These and further objects, features and advantages of the present invention will become more apparent from the following description when taken in connection with the accompanying drawing which shows, for purposes of illustration only, several embodiments in accordance with the present invention, and wherein:

FIG. 1 is a side elevational view on the inner clamping band portion of a two-partite clamp structure in accordance with the present invention;

FIG. 2 is a view of the inner clamping band portion of FIG. 1;

FIG. 3 is a top plan view on the outer clamping band portion of the two-partite clamp structure in accordance with the present invention;

FIG. 4 is an axial view on the installed clamp structure in accordance with the present invention, but prior to its tightening on the object to be fastened thereby;

FIG. 5 is a side elevational view of FIG. 4;

DETAILED DESCRIPTION OF THE DRAWINGS

Figure 12:
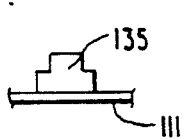
FIG. 12 is an enlarged side elevational view illustrating a positioning and fastening tab-like member in accordance with the present invention.
Figure 11:
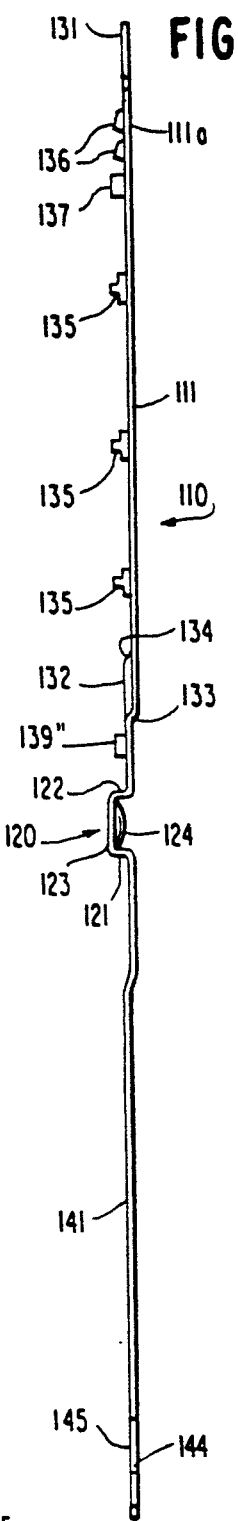
FIG. 11 is a side elevational view of the clamp structure of FIG. 10.
Figure 10:
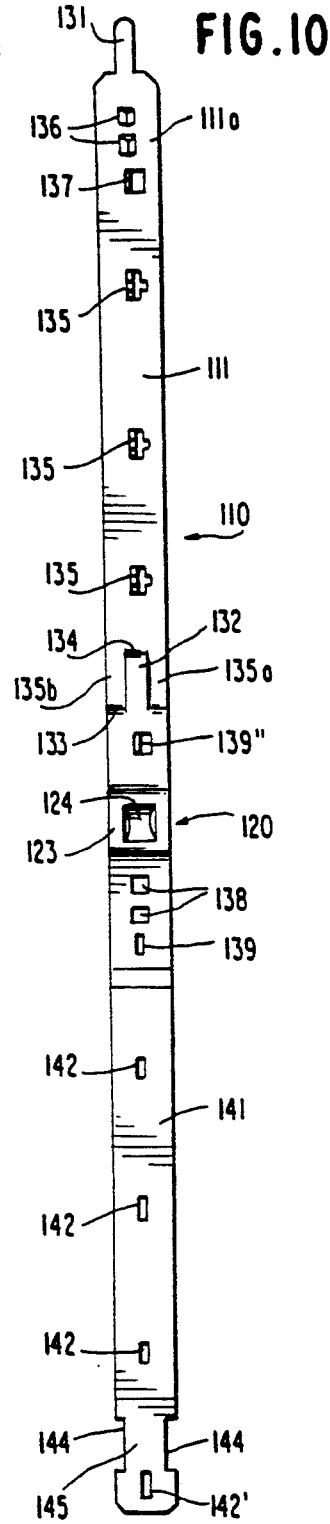
FIG. 10 is a top plan view on a modified embodiment of a clamp structure of the one-piece type in accordance with the present invention.

Referring now to the drawing, and more particularly to FIGS. 1 through 4, reference numeral 10 generally designates the clamp structure which consists of the first inner clamping band portion 11 and of the second outer clamping band portion 41. The inner clamping band portion 11 includes a so-called "Oetiker" ear generally designated by reference numeral 20 for tightening the clamp structure about the object to be fastened thereby, such as an axle boot, and includes generally outwardly extending leg portions 21 and 22 interconnected by a bridging-portion 23 provided with a reinforcing means 24 which may be in the form of the relatively narrow longitudinally extending circumferential reinforcing groove as disclosed in my prior U.S. Pat. No. 3,523,337 or a shallow depression of substantially rectangular shape disclosed in my copending application Ser. No. 07/822 488, now U.S. Pat. No. 5,282,295 filed Jan. 10, 1992 and entitled "Deformable Ear For Clamps", the subject matter of which is incorporated herein. To provide an internal clamping surface devoid of any step, gap or discontinuity, the clamping band portion 11 is provided in its inner band end portion 11a with a tongue-like extension 31 which, in the installed condition, together with the inner band end portion 11a, is overlapped by the outer band portion 11b. The tongue-like extension 31 is adapted to engage in a tongue-receiving channel 32 which begins at a first step-like portion 33 and terminates in a second step-like portion 34 as more fully disclosed in my prior U.S. Pat. No. 4,299,012. The height of the first step-like portion 33 is such that the remaining lateral band portions 35a and 35b on both sides of the pressed-out tongue-receiving channel 32 are brought to the height of the outer band portion, i.e., the height of the step-like portion 33 is substantially equal to the thickness of the clamping band. As a result thereof, the full band width is again available to the left of the step-like portion 33 as viewed in FIGS. 1 and 2 so that the inner band end portion 11a as also the adjoining tongue-like extension 31 are guided as well as constrained against outward deflection. Furthermore, this arrangement permits any gap that remains underneath the ear 20 after plastic deformation thereof, to be covered by the full band width of the inner band portion so that maximum resistance against deflection into such gap is offered by the full band width. The inner, first clamping band portion 11 is further provided with outwardly extending hooks of any conventional type, preferably of the type disclosed also in my prior U.S. Pat. No. 4,299,012 or in my prior U.S. Pat. No. 4,622,720 and consisting of two cold-deformed support hooks 36 and a combined guide-and-support hook 37 whose plane extends in the circumferential direction as disclosed in the last-mentioned patent. The outer second band portion 11b is provided with apertures 38 and 39 for engagement by the outwardly extending hook members 36 and 37. The slot-like aperture 39 is thereby left after a tab-like member 39', also extending in the longitudinal direction of the clamping band is pressed out. A pressed-out tab-like member 39" on the opposite side of the ear 20 is formed in a similar manner. The tab-like members 39' and 39" are thereby adapted to engage in slot-like apertures 42' and 42" for purposes of securing the outer, second clamping band portion 41 onto the inner, first clamping band portion 11. For that purpose, the tab-like members 39' and 39" may be bent over to form a rivet-like connection as disclosed in my prior U.S. Pat. No. 3,287,314. In the alternative, a spot-welded connection may be used without one or both of the tab-like members 39' and 39". In order to prevent relative movement between the outer, second clamping band portion 41 and the inner, first clamping band portion 11, the latter is provided with several tab-like members 35 (see also FIG. 12 for details of construction) which are adapted to engage in slot-like apertures 42 in the outer clamping band portion 41 where they may be merely bent over and, if so desired, deformed to provide again a rivet-like connection. However, it suffices if the tab-like members 35 merely extend through the slot-like openings 42 without any rivet-like connection because the outer, second clamping band portion 41 is held onto the inner first clamping band portion 11 by the tab-like members 39' and 39". The outer, second clamping band portion 41 is additionally provided with mutually oppositely disposed lateral cut-outs 44 which, as shown in FIG. 3, may be of rectangular shape or any other known suitable shape.

Figure 6:
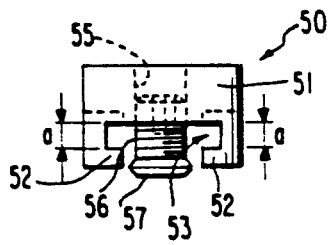
FIG. 6 is an end elevational view of one embodiment of a counterweight in accordance with the present invention.
Figure 7:
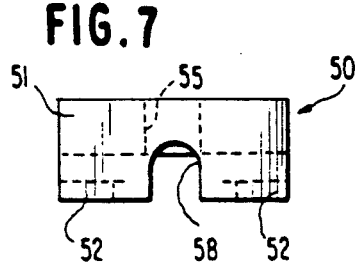
FIG. 7 is a side elevational view of the counterweight shown in FIG. 6.
Figure 8:
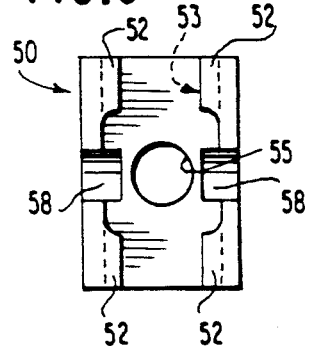
FIG. 8 is a plan view on the counterweight of FIG. 6.

The counterweight generally designated by reference numeral 50 as shown in FIGS. 6-8 includes a hollow housing 51 made, for example, from cold-forged steel band or sintered metal powder material. At its bottom, the housing 51 is provided with four mutually oppositely directed foot portions 52 spaced from the bottom of the housing 51 by a distance a which is equal to or slightly larger than the thickness of clamping band material of the second clamping band portion. The two foot portions 52 on each side of the housing bottom are of such shape and of such longitudinal spacing that they will fit into the corresponding cut-out 44. The channel 53 formed by these foot portions 52 with the bottom of the housing 51 is of such dimension as to permit accommodation of the thickness of the second outer clamping band portion so that the counterweight can be mounted over the outer, second clamping band portion by inserting it within the area of the cut-outs 44 and then sliding it along the outer clamping band portion 41, the guided sliding movement being made possible by the foot portions 52 in the form of the illustrated short legs. For purposes of fastening the counterweight in predetermined position, the housing 51 is additionally provided with a threaded bore 55 to receive a threaded member 56 which is provided with an enlargement 57 at its lower end so that it can be screwed upwardly into the bore 55 only up to a predetermined point. This will preclude the threaded member 56 from either coming out of the bore 55 due to vibrations or centrifugal forces as occur in operation. The counterweight housing may also be provided with one or more bores (not shown) appropriately spaced to fill in counterweight material such as molten lead into the correspondingly provided hollow spaces in the housing.

Figures 13, 14:
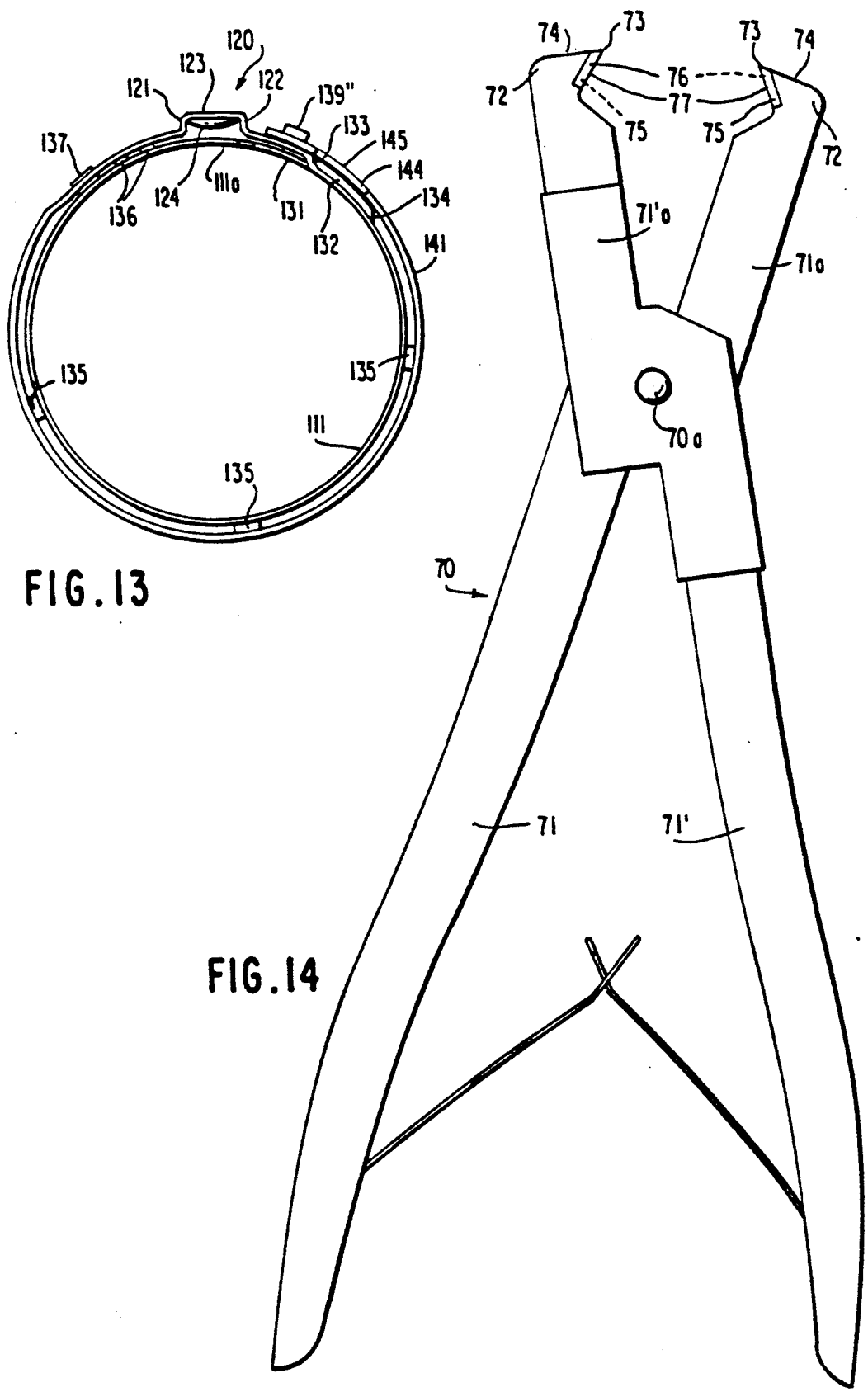
FIG. 13 is an axial elevational view, similar to FIG. 4, and illustrating the clamp structure of FIGS. 10 and 11 assembled, but prior to tightening thereof.
FIG. 14 is an elevational view of a special tool in accordance with the present invention for securely fixing the counterweight on the clamp structure in accordance with the present invention.

Though the set screw 56 will provide a secure mounting of the counterweight housing on the second outer clamping band portion 41, the present invention proposes additional safety measures to preclude movement of the counterweight. This is achieved by the use of a special tool generally designated by reference numeral 70 (FIG. 14) which includes two long handle portions 71 and 71' pivotally connected with each other at 73 so that their extensions 71a and 71'a continue on opposite sides beyond this pivotal connection. For purposes of forcibly displacing the band portion on which the counterweight material is mounted, the extensions 71a and 71'a are provided with specially configured tool sections 72 and 72' whose jaws form a sharp point 73 in the triangular part 74 whose sides 75 and 76 are cut to form a sharp edge 77. By applying the tool 70 against the clamping band portion within the area where the counterweight is mounted on the second outer clamping band, the edge portions of this clamping band portion are deformed into the cavities 58 provided in the counterweight.

Figure 9:
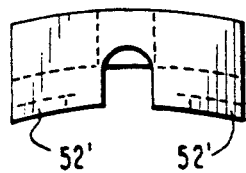
FIG. 9 is a side elevational view, similar to FIG. 7, of a modified embodiment of a counterweight in accordance with the present invention.

FIG. 9 illustrates a modified embodiment of a counterweight, similar to that of FIGS. 6 through 8 but differing therefrom in that the effective inner surface including the foot-like portions 52' form a curved surface of predetermined radius.

FIG. 4 illustrates a clamp structure in accordance with the present invention assembled into circular shape but prior to being contracted on the object to be fastened thereby.

FIGS. 10 through 13 illustrate a modified embodiment of a clamp structure in accordance with the present invention in which the clamp structure is made in one piece. Corresponding parts are designated in these figures by corresponding reference numerals of the 100 series.

The clamp structure generally designated by reference numeral 110 includes a first clamping band portion 111 whose inner end portion 111a again terminates in a tongue-like extension 131. The tongue-like extension 131 is adapted to engage in tongue-receiving channel 132 of a construction similar to that in the embodiment of FIGS. 1 and 2. The tab-like member 139" between the tongue-receiving channel 132 and the ear 120 is adapted to engage in slot-like aperture 142' provided at the free end of the outer second clamping band portion 141 which, differing from the embodiment of FIGS. 1-4 is now integral with the clamping band 111. Further differing from the embodiment of FIGS. 1 through 4, the tab-like member 39' as also the aperture 42" are therefore no longer required.

As to the rest, what was said with respect to the embodiment of FIGS. 1 through 4 applies to the embodiment of FIGS. 10 through 13.

As mentioned, the counterweight housing may be hollow and provided with one or more cavities which are adapted to be filled by way of a respective fill-in opening. Moreover, a rivet member with an internal threaded bore may be fixed into such a housing in a conventional manner for engagement of the set screw provided with the enlarged end as mentioned above.

The present invention offers the significant advantage that the clamp structure, which can incorporate numerous features of commercially immensely successful hose clamps, will not only permit the elimination of imbalances in the clamp itself but also the elimination of imbalances which exist in the entire assembly consisting of hose-like object (axle boot), axle and clamp structure with counterweight. Thus, the present invention offers greater universal applicability than attainable heretofore. In addition thereto, it permits use of a so-called stepless clamp structures which is important with hard, thin plastic material such as "Hytrell" material used at present with axle boots.

The counterweights usable with this invention can be made larger, heavier or smaller, more light weight, as needed to be stocked in standard sizes. In order to be able to achieve complete balance by fine-tuning each counterweight, appropriate amounts of counterweight material can be selectively removed with the use of a simple drill. This permits fine adjustment of every tenth of a gram by boring out the corresponding amount of counterweight material.

By utilizing a set screw, which is so modified that it can never fall out in the presence of vibrations or centrifugal forces, injury is avoided in a highly reliable manner. Moreover, a loss of this set screw, which might jeopardize the balance of the assembly, is thus avoided with certainty. The tool in accordance with the present invention further assures that the counterweight can be secured at the respective clamping band portion in a highly reliable manner. Tests have indicated that this counterweight will remain completely satisfactorily in its predetermined position by the use of tool 70 as described. Of course, more than one counterweight of appropriate size and weight may also be mounted and secured in the manner described on the outer clamping band portion if needed to achieve a balance.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A balancing arrangement for a rotating member, comprising a clamp structure including clamping band means having a first clamping band portion and a second clamping band portion fixed relatively to said first clamping band portion, counterweight means for mounting on said clamp structure in predetermined position to balance any existing imbalances, said second clamping band portion at least partly surrounding said first clamping band portion, said first clamping band portion being disposed radially inwardly of and overlapped by said second clamping band portion said second clamping band portion spaced from said first clamping band portion, and means for securing said counterweight means on said second clamping band portion within the area of spaced overlap.

2. A balancing arrangement according to claim 1, wherein the first clamping band portion is integral with said second clamping band portion so as to form a one-piece clamping band means.

3. A balancing arrangement according to claim 2, wherein said first clamping band portion extends over at least 360° of the circumference of the clamp structure and passes over into the second clamping band portion.

4. A balancing arrangement according to claim 1, wherein said second clamping band portion is a separate part and is fixedly secured at one end to said first clamping band part.

5. A balancing arrangement according to claim 1, wherein means are provided in the overlapping area of said first and second clamping band portions to prevent relative movement therebetween in the circumferential as well as in the axial direction of the clamp structure.

6. A balancing arrangement according to claim 5, wherein said means preventing relative movement includes tab-like means in one of said band portions extending toward the other band portion and adapted to engage in corresponding aperture means in the other band portion.

7. A balancing arrangement according to claim 1, wherein said second clamping band portion is provided with lateral cut-out means to enable mounting of said counterweight means on said second clamping band portion in such a manner that said counterweight means is operable to slide on said second clamping band portion from the area of said cut-out means to a predetermined balancing position.

8. A balancing arrangement according to claim 7, wherein said lateral cut-out means are provided in the edge portions of said second clamping band portion on mutually opposite sides in such a manner that a narrower central web portion remains between mutually facing lateral cut-out means to enable the counterweight means to be installed on said second clamping band portion.

9. A balancing arrangement according to claim 8, wherein said counterweight means forms a hollow housing means adapted to be filled with a counterweight material, said housing means being provided with at least approximately mutually oppositely directed foot portions which are spaced from the bottom of the housing means by a distance substantially corresponding at least to the thickness of the clamping band means and which are of a shape complementary to but smaller than the cut-out means so that said counterweight means can be mounted on said second clamping band portion by inserting said foot portions through said lateral cut-out means into the space between said first and said second clamping band portions and thereafter sliding said counterweight means on said second clamping band portion in the circumferential direction into a predetermined balancing position.

10. A balancing arrangement according to claim 9, further comprising means for securing said counterweight means in its predetermined balancing position including threaded means extending from the bottom surface of said counterweight means and adapted to be screwed into the outer surface of said second clamping band portion from the top of said counterweight means.

11. A balancing arrangement according to claim 10, wherein said threaded means is so constructed that it cannot move in the direction toward the top of the counterweight means beyond a predetermined point in said counterweight means.

12. A balancing arrangement according to claim 11, wherein said threaded means is provided with an enlargement in its lower end area which is larger than the threaded bore in the counterweight means.

13. A balancing arrangement according to claim 9, wherein said counterweight material is a relatively soft material selected from the group consisting of lead, lead-containing alloys and similar materials, and wherein said securing means includes tool means operable to engage the clamping band portion on which the counterweight means is mounted to deform the last-mentioned clamping band portion so as to positively retain the counterweight means after completion of the balancing.

14. A balancing arrangement according to claim 1, wherein said clamp structure includes means for tightening the clamp structure on a rotating member to be balanced.

15. A balancing arrangement according to claim 14, wherein said tightening means includes at least one ear means in said second clamping band portion, said ear means having two generally outwardly extending leg portions interconnected by a bridging portion provided with reinforcing means.

16. A balancing arrangement according to claim 1, wherein said clamp structure is an open clamp structure with overlapping inner and outer band portions in said first clamping band portion and with connecting means for connecting the overlapping band portions.

17. A balancing arrangement according to claim 16, further comprising means to effectively eliminate any step or offset at the end of the overlapped inner band portion including tongue means at the inner overlapped band portion operable to engage in a tongue-receiving means in the outer overlapping band portion, said tongue-receiving means beginning at a first step-like portion having a height substantially corresponding to the thickness of the clamping band material so that the remaining lateral clamping band portions on both sides of the tongue-receiving means are brought to the height of the overlapping outer band portion and the full band width is again available on the side of the step-like portion where said tongue-receiving means begins to guide the tongue-like portion and restrain radial outward movement thereof.

18. A balancing arrangement according to claim 17, wherein said tongue-receiving means is formed by one of tongue-receiving channel and opening starting at the first step-like portion.

19. A balancing arrangement according to claim 9, wherein said housing means is hollow and made from deformed sheet metal or sintered material.

20. A balancing arrangement according to claim 19, wherein said housing means is provided with at least one fill-in opening for filling-in molten counterweight material.

21. A balancing arrangement according to claim 3, wherein said first clamping band portion extends over more than 360° to provide overlapping inner and outer band portions, further comprising means to effectively eliminate any step or offset at the end of the overlapped inner band portion including tongue means at the inner overlapped band portion operable to engage in a tongue-receiving means in the outer overlapping band portion, said tongue-receiving means beginning at a first step-like portion having a height substantially corresponding to the thickness of the clamping band material so that the remaining lateral clamping band portions on both sides of the tongue-receiving means are brought to the height of the overlapping outer band portion and the full band width is again available on the side of the step-like portion where said tongue-receiving means begins to guide the tongue-like portion and restrain radial outward movement thereof.

22. A balancing arrangement according to claim 21, wherein said tongue-receiving means is formed by one of tongue-receiving channel and opening starting at the first step-like portion.

23. A balancing arrangement for a rotating member according to claim 1, wherein said second clamping band portion entirely clamping band portion.

24. A balancing arrangement according to claim 23, wherein the first clamping band portion extends over more than 360° with predetermined overlap in the first clamping band portion, and wherein overlapping parts of the first clamping band portion are connected with each other.

25. A balancing arrangement according to claim 1, wherein the first clamping band portion extends over more than 360° with predetermined overlap in the first clamping band portion, and wherein overlapping parts of the first clamping band portion are connected with each other.

* * * * *